(12) United States Patent
Friggstad

(10) Patent No.: US 10,499,553 B2
(45) Date of Patent: Dec. 10, 2019

(54) IMPLEMENT WITH FORWARD FOLDING WING FRAMES

(71) Applicant: Pillar Lasers Inc., Warman (CA)

(72) Inventor: Terrance A. Friggstad, Grasswood (CA)

(73) Assignee: Pillar Lasers Inc., Warman (CA)

( * ) Notice: Subject to any disclaimer, the term of this patent is extended or adjusted under 35 U.S.C. 154(b) by 61 days.

(21) Appl. No.: 15/909,325

(22) Filed: Mar. 1, 2018

(65) Prior Publication Data

US 2018/0295770 A1 Oct. 18, 2018

(30) Foreign Application Priority Data

Apr. 18, 2017 (CA) ........................ 2964431

(51) Int. Cl.
*A01B 73/06* (2006.01)

(52) U.S. Cl.
CPC .................... *A01B 73/065* (2013.01)

(58) Field of Classification Search
CPC ........ A01B 73/02; A01B 73/06; A01B 73/065
USPC .................................................. 172/311, 683
See application file for complete search history.

(56) References Cited

U.S. PATENT DOCUMENTS

| | | | |
|---|---|---|---|
| 6,371,216 B1 | 4/2002 | Friggstad | |
| 6,684,962 B1 | 2/2004 | Lewallen | |
| 7,581,597 B2 | 9/2009 | Neudorf et al. | |
| 8,127,861 B2 * | 3/2012 | Meek | A01B 73/065 |
| | | | 172/311 |
| 8,567,517 B2 | 10/2013 | Friggstad et al. | |
| 9,198,342 B2 | 12/2015 | Friggstad | |
| 9,320,190 B2 * | 4/2016 | Sauder | A01B 63/145 |
| 9,554,497 B2 | 1/2017 | Sudbrink et al. | |
| 9,883,623 B2 * | 2/2018 | Koch | A01B 73/065 |
| 9,907,223 B2 * | 3/2018 | Dienst | A01B 73/065 |
| 9,961,822 B2 * | 5/2018 | Sauder | A01B 63/145 |
| 10,194,576 B2 * | 2/2019 | Koch | A01B 73/065 |
| 2005/0087350 A1 * | 4/2005 | Bauer | A01B 73/065 |
| | | | 172/311 |
| 2007/0163791 A1 | 7/2007 | Meek | |
| 2010/0126743 A1 * | 5/2010 | Poole | A01B 73/065 |
| | | | 172/311 |
| 2013/0233580 A1 * | 9/2013 | Kinzenbaw | A01B 73/065 |
| | | | 172/1 |
| 2018/0255694 A1 * | 9/2018 | Sauder | A01B 63/145 |
| 2019/0059201 A1 * | 2/2019 | Koch | A01B 73/065 |
| 2019/0124822 A1 * | 5/2019 | Czapka | A01B 73/065 |

* cited by examiner

*Primary Examiner* — Gary S Hartmann
(74) *Attorney, Agent, or Firm* — Frost Brown Todd LLC

(57) ABSTRACT

An implement has right and left pivotally attached tool bar frames movable from an operating position extending laterally to a transport position extending forward from the connecting pivot axis. Right and left hitch arms are pivotally attached about vertical axes at rear ends to spaced apart locations the right and left tool bar frames and extend forward and inward when the tool bar frame is in the operating position. A hitch frame is pivotally attached at right and left rear portions thereof to front ends of the hitch arms about vertical axes. When the tool bar frame is in the transport position, the rear end of the hitch frame is forward of the right and left tool bar frames, and the front end of the hitch frame, attachable to a tractor, is a desired clearance distance forward of the right and left tool bar frames.

13 Claims, 12 Drawing Sheets

IMPLEMENT WITH FORWARD FOLDING WING FRAMES

CROSS-REFERENCE TO RELATED APPLICATION

This application claims priority to and benefit of CA Serial No. 2,964,431, filed Apr. 18, 2017, the contents of which are incorporated by reference in their entirety for all purposes.

FIELD OF THE INVENTION

This disclosure relates to the field of agricultural implements and in particular an implement with forward folding wing frames.

BACKGROUND

Wide agricultural implements typically include wing frames extending laterally from a center of the implement where each wing frame is pivotally attached to the adjacent wing frame about a horizontal pivot axis aligned with the operating travel direction such that each wing frame can pivot up and down with respect to the next to follow ground contours and maintain a desired depth of ground penetration of ground engaging tools such as furrow openers.

It is common to fold the wing frames upward and inward to a more compact transport position as disclosed in U.S. Pat. No. 6,684,962 to Lewallen, however with wider implements the implement in the transport position can be quite high causing stability problems as well as making same difficult to move under utility lines, bridges, and the like.

Thus it is also known to fold the wing frames rearward as disclosed for example in U.S. Pat. No. 7,581,597 to Neudorf et al., U.S. Pat. No. 8,567,517 to Friggstad et al., and U.S. Pat. No. 9,198,342 to Friggstad. With an implement such as an air seeder it is common to pull a cart behind the implement to supply agricultural products such as seed and fertilizer. These carts can be very large and must be towed rearward of ends of the wing frames in the transport position which is a significant distance from the towing tractor such that stability during towing can be problematic.

It is also known to fold the wing frames of agricultural implements forward to a more compact transport position however the width of the implement is limited by the length of the hitch. In order to accommodate wider implements the hitch length can be extended when in the transport position, as disclosed in U.S. Pat. No. 6,371,216 to Friggstad and U.S. Pat. No. 9,554,497 to Sudbrink et al. and in United States Published Patent Application Number 20070163791 of Meek.

Such telescoping hitches require considerable added material to provide the required strength to resist the forces exerted on the hitch, and lock mechanisms are required to secure the hitch in the extended and retracted positions which must be engaged and disengaged when moving between the operating and transport positions, adding time and complexity. This telescoping also adds complexity when locating hydraulic lines from the tractor to the implement, product lines for air seeders, and the like.

In such forward and rearward folding implements the implement typically comprises a tool bar extending laterally with the desired number of wing frames, and then tool carrier frames pivotally mounted to the tool bar such that the carrier frames extend generally horizontally from the tool bar when in the operating position and upward when in the transport position. The carrier frames can extend horizontally rearward of the tool bar as in U.S. Pat. No. 7,581,597 to Neudorf et al., U.S. Pat. No. 8,567,517 to Friggstad et al., or forward of the tool bar as in U.S. Pat. No. 9,198,342 to Friggstad.

Ground engaging tools such as furrow openers are attached to each carrier frame and are moved into and out of engagement with the ground surface. In the implement of U.S. Pat. No. 8,567,517 to Friggstad et al. each ground engaging tool is pivotally attached to the carrier frame which remains horizontal and stationary at a defined vertical location with respect to the ground when in the operating position. The ground engaging tools pivot up and down with respect to the carrier frame to engage or disengage the ground. In the implement of U.S. Pat. No. 6,371,216 to Friggstad, the ground engaging tools are fixed to the carrier frame which is maintained at a horizontal orientation and moved up and down to engage and disengage the tools with the ground.

BRIEF SUMMARY

The present disclosure provides an implement apparatus that overcomes problems in the prior art.

In a first embodiment the present disclosure provides an implement apparatus comprising a tool bar frame mounted on tool bar wheels for travel along a ground surface in an operating travel direction. The tool bar frame comprises a right tool bar frame and a left tool bar frame pivotally attached at a front inner end thereof to a front inner end of the right tool bar frame about a substantially vertical center frame axis located on a central tool bar axis that is aligned with the operating travel direction in a center of the tool bar frame. The tool bar frame is movable from an operating position, where the right and left tool bar frames are oriented substantially perpendicular to the central tool bar axis and extend laterally away from the central tool bar axis, to a transport position where the right and left tool bar frames are substantially aligned with the central tool bar axis and extend forward from the center frame axis. An operating position latch is operative to releasably connect a rear portion of the right tool bar frame to a rear portion of the left tool bar frame when the tool bar frame is in the operating position, and a transport position latch is operative to releasably connect the right tool bar frame to the left tool bar frame when the tool bar frame is in the transport position. Right and left hitch arms are pivotally attached at rear ends thereof to spaced apart locations on front portions of the corresponding right and left tool bar frames about substantially vertical corresponding right and left rear hitch arm axes and extend forward from the tool bar frame and inward toward the central tool bar axis when the tool bar frame is in the operating position. A rigid hitch frame is adapted at a front end thereof for attachment to a towing vehicle and is pivotally attached at corresponding right and left rear portions thereof to front ends of the corresponding right and left hitch arms about corresponding substantially vertical right and left front hitch arm axes. The hitch arms and hitch frame are configured such that when the tool bar frame is in the transport position, the rear end of the hitch frame is forward of the right and left tool bar frames, and the front end of the rigid hitch frame is a desired clearance distance forward of the right and left tool bar frames.

In a second embodiment the present disclosure provides an implement apparatus comprising a tool bar frame mounted on tool bar wheels for travel along a ground surface in an operating travel direction, the tool bar frame comprising a right tool bar frame and a left tool bar frame pivotally attached to the right tool bar frame about a substantially vertical center frame axis such that the tool bar frame is movable from an operating position, where the right and left tool bar frames are oriented substantially perpendicular to the operating travel direction, to a transport position where the right and left tool bar frames are substantially aligned with the operating travel direction and extend forward from the center frame axis. A plurality of carrier frames is attached at front ends thereof to the tool bar frame such that the carrier frames are laterally spaced along a width of the tool bar frame, and such that the carrier frames are movable from an operating position extending rearward from the tool bar frame to a transport position extending upward from the tool bar frame. A carrier wheel is mounted to a rear portion of each carrier frame, and a plurality of ground engaging tools is mounted to each carrier frame. The tool bar wheels and carrier wheels are caster wheels pivotally mounted to the corresponding tool bar frame and carrier frames about vertical caster axes. When the tool bar frame is in the operating position the tool bar wheels are substantially free to pivot about their respective caster axes and the carrier wheels are secured to resist pivoting about their respective caster axes away from a forward orientation rolling in the operating travel direction. When the tool bar frame moves from the operating position toward the transport position the tool bar wheels and carrier wheels are substantially free to pivot about their respective caster axes, and when the tool bar frame is in the transport position, selected tool bar wheels are locked to prevent pivoting about their respective caster axes away from the forward orientation rolling in the operating travel direction.

The present disclosure provides a wide forward folding implement where no complex and costly telescoping mechanism is required. All wheels are castering wheels, facilitating movement between the operating and transport positions, and the pivoting movement of the wheels about the respective caster axes is controlled to provide a desired operating castering action when the tool bar frame is in the operating position, and a different desired transport castering action when the tool bar frame is in the transport position. The castering action is controlled conveniently by hydraulic cylinders, electric actuators, or like devices which may be operated manually or remotely from the towing vehicle. The required control of the actuators is simple, as the actuators are either in a lock/catch mode or a release mode.

BRIEF DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

FIGS. 1-4 and 7 illustrate an embodiment of an implement apparatus 1 of the present disclosure. The apparatus 1 comprises a tool bar frame 3 mounted on tool bar wheels 5 for travel along a ground surface 7 in an operating travel direction T. The tool bar frame 3 comprises a right tool bar frame 3R and a left tool bar frame 3L pivotally attached at a front inner end thereof to a front inner end of the right tool bar frame 3R about a vertical center frame axis CFA located on a central tool bar axis TA that is aligned with the operating travel direction in a center of the tool bar frame 3.

Figure 1:
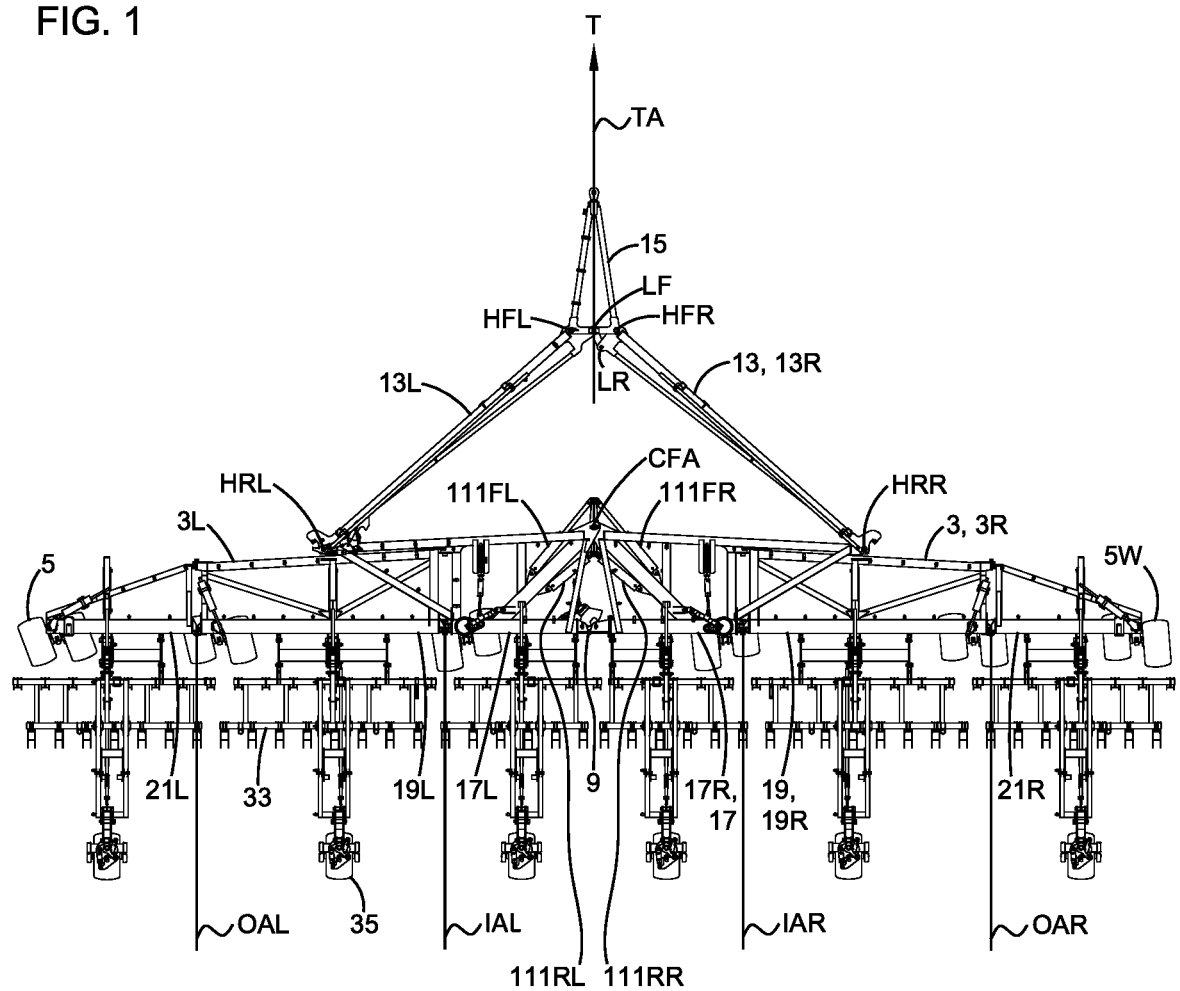
FIG. 1 is a top view of an embodiment of the implement apparatus of the present disclosure in the operating position.
Figure 2:
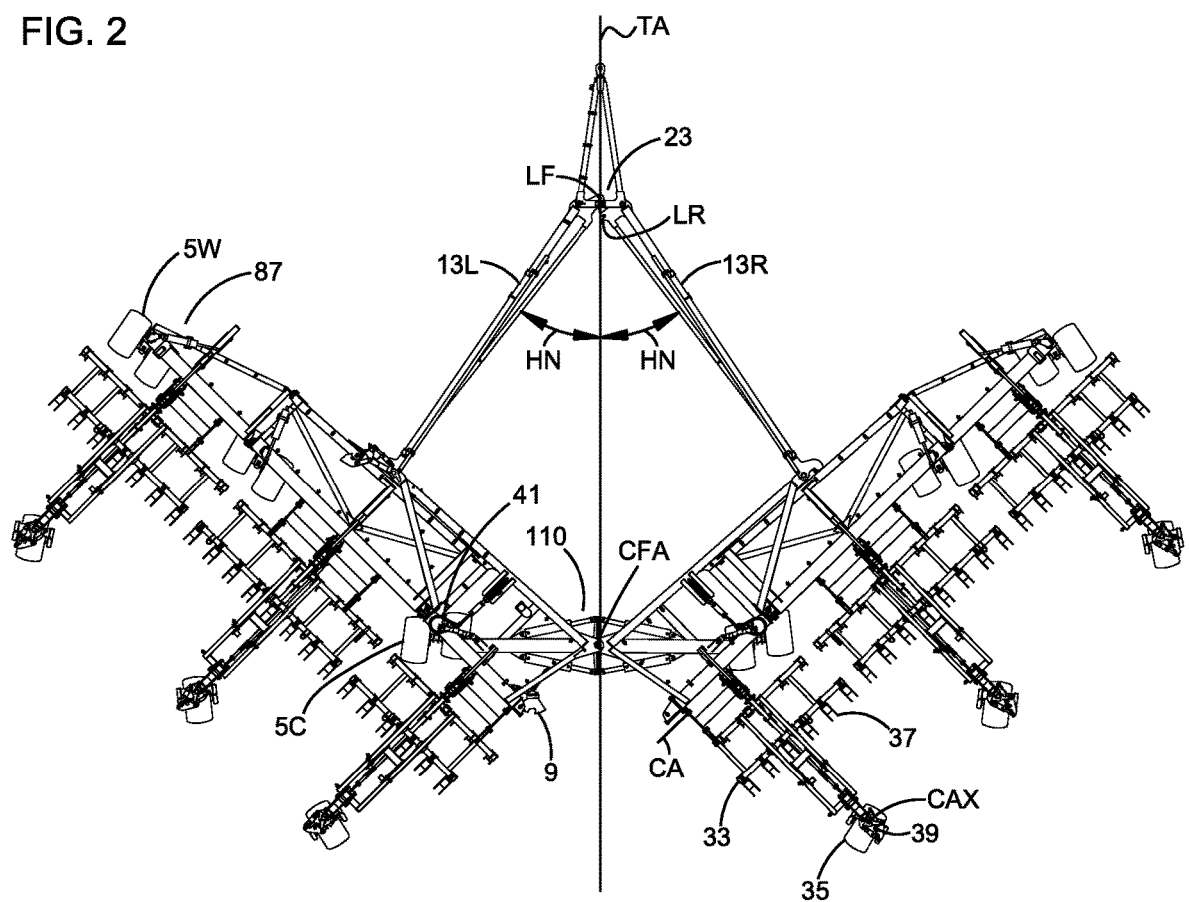
FIG. 2 is a top view of the embodiment of FIG. 1 with the tool bar frames in an intermediate position between the operating and transport positions.
Figure 3:
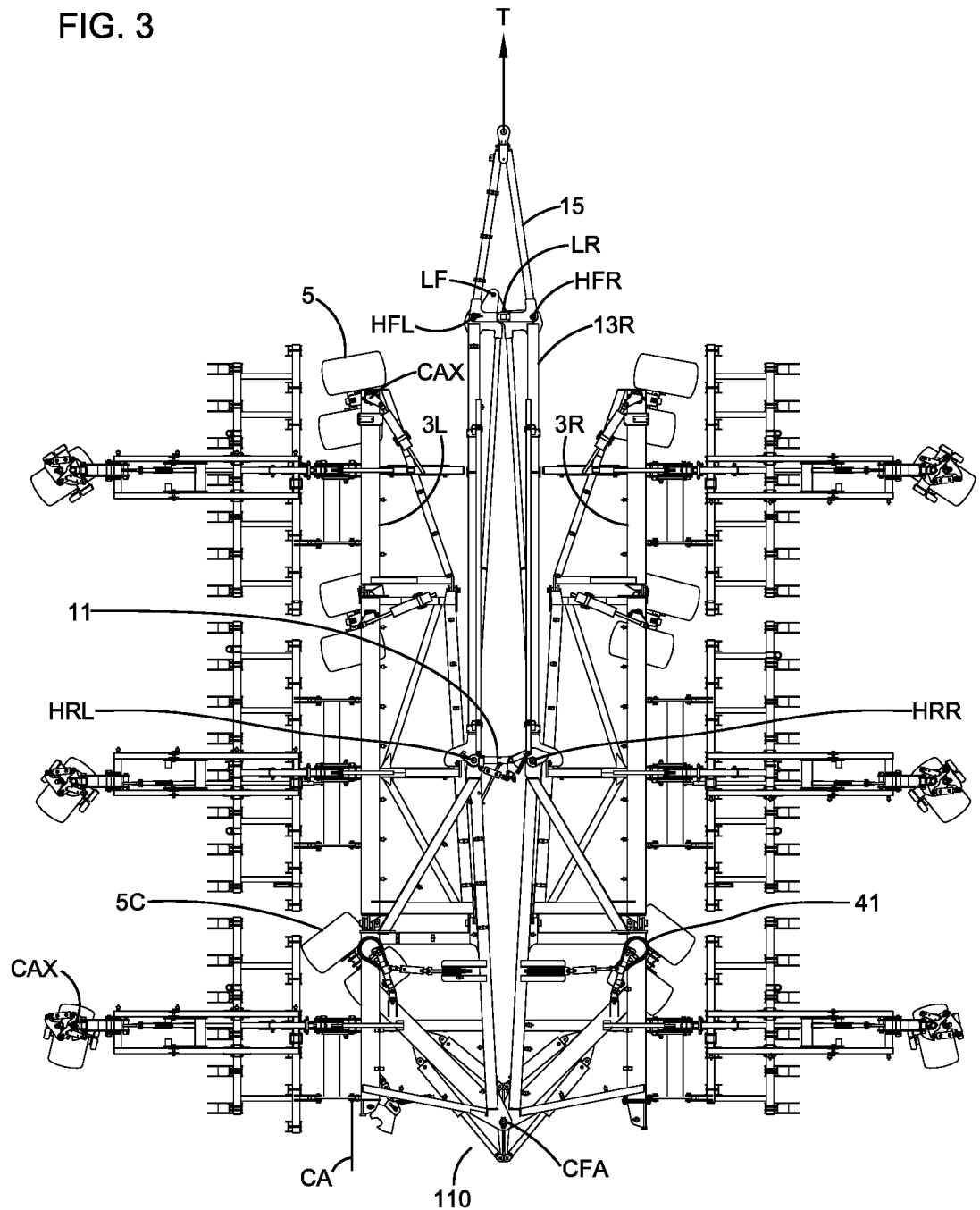
FIG. 3 is a top view of the embodiment of FIG. 1 with the tool bar frames in the transport position, and the carrier frames in their lowered operating positions.
Figure 4:
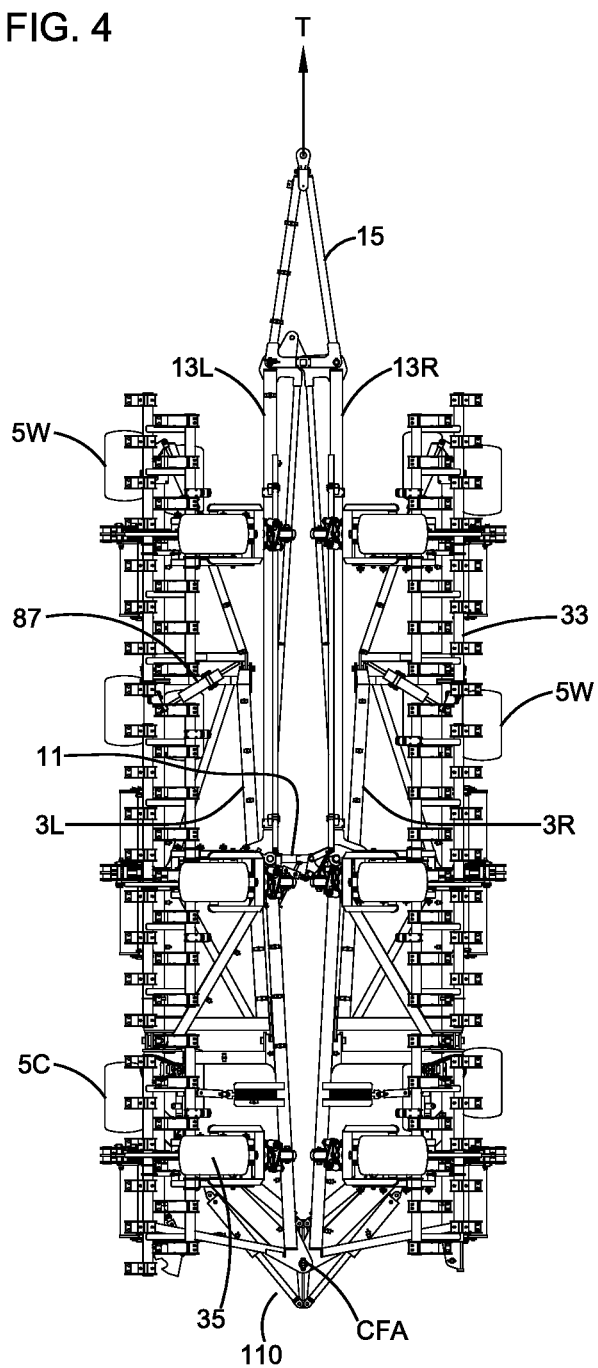
FIG. 4 is a top view of the embodiment of FIG. 1 with the tool bar frames in the transport position, and the carrier frames in their raised transport positions.

The tool bar frame 3 is movable from an operating position shown in FIG. 1, where the right and left tool bar frames 3R, 3L are oriented substantially perpendicular to the central tool bar axis TA and extend laterally away from the central tool bar axis TA, to a transport position shown in FIGS. 3 and 4 where the right and left tool bar frames 3R, 3L are substantially aligned with the central tool bar axis T and operating travel direction T and extend forward from the center frame axis CFA.

An operating position latch 9 is operative to releasably connect a rear portion of the right tool bar frame 3R to a rear portion of the left tool bar frame 3L when the tool bar frame 3 is in the operating position, and a transport position latch 11 is operative to releasably connect a middle portion of the right tool bar frame 3R to a middle portion of the left tool bar frame 3L when the tool bar frame is in the transport position.

Right and left hitch arms 13R, 13L are pivotally attached at rear ends thereof to spaced apart locations on front portions of the corresponding right and left tool bar frames 3R, 3L about substantially vertical corresponding right and left rear hitch arm axes HRR, HRL and extend forward from the tool bar frame 3 and inward toward the central tool bar axis TA when the tool bar frame 3 is in the operating position.

A rigid hitch frame 15 is adapted at a front end thereof for attachment to a towing vehicle typically a tractor, and is pivotally attached at corresponding right and left rear portions thereof to front ends of the corresponding right and left hitch arms about corresponding substantially vertical right and left front hitch arm axes HFR, HFL.

The hitch arms 13 and 15 and hitch frame are configured such that when the tool bar frame 3 is in the transport position, the rear end of the hitch frame 15 is forward of the right and left tool bar frames 3R, 3L, and the front end of the rigid hitch frame 15 is a desired clearance distance forward of the right and left tool bar frames 3R, 3L. The tractors towing the apparatus 1 will typically have wide dual wheels or tracks and to allow the tractor to turn it is necessary to provide a sufficient open area between the front of the hitch frame 15 and the front ends of the right and left tool bar frames 3R, 3L.

Attaching the rear ends of the lengthy hitch arms 13 to widely spaced rear hitch arm axes HRR, HRL allows the front ends of the hitch arms 13 to extend past the front ends of the tool bar frames 3R, 3L and provide the required clearance distance without the need for a telescoping hitch mechanism.

To move from the operating position of FIG. 1 to the transport position of FIGS. 3 and 4 the operating position latch 9 is released and a hydraulic cylinder assembly 110, described below, is operative to selectively pivot the right and left tool bar frames 3R, 3L about the center frame axis CFA. The hydraulic cylinder assembly 110 exerts forces that move the right and left tool bar frames 3R, 3L to the intermediate position of FIG. 2 and then to the transport position of FIG. 3 where the transport position latch 11 can be latched to secure the tool bar frames 3R, 3L together. To move from the transport position to the operating position the transport position latch is released, the tractor moves the hitch frame 15 rearward and the right and left tool bar frames 3R, 3L move to the intermediate position of FIG. 2 and then to the operating position of FIG. 1 where the operating position latch 9 can be latched.

During movement between the operating position and transport position, depending on the terrain, slope, and surface hardness, the tractor will typically be in neutral and will roll back and forth and/or the drill will roll back and forth. An operator will see what is happening and can move the tractor forward or backward to relieve some of the required hydraulic force.

In the illustrated apparatus 1 the right tool bar frame 3R comprises a right center frame 17R and a right inner wing frame 19R pivotally attached to the right end of the right center frame 17R about a right inner wing frame axis IAR oriented, when the tool bar frame 3 is in the operating position, substantially horizontally and aligned with the operating travel direction T. Similarly the left tool bar frame 3L comprises a left center frame 17L and a left inner wing frame 19L pivotally attached to the left end of the left center frame 17L about a left inner wing frame axis IAL oriented, when the tool bar frame 3 is in the operating position, substantially horizontally and aligned with the operating travel direction T. The right and left rear hitch arm axes HRR, HRL are located on front sides of the corresponding right and left inner wing frames 19R, 19L, about in the middle of each inner wing frame 19.

A right outer wing frame 21R is then pivotally attached to the right end of the right inner wing frame 19R about a right outer wing frame axis OAR oriented, when the tool bar frame 3 is in the operating position, substantially horizontally and aligned with the operating travel direction T, and a left outer wing frame 21L pivotally attached to the left end of the left inner wing frame 19L about a left outer wing frame axis OAL oriented, when the tool bar frame 3 is in the operating position, substantially horizontally and aligned with the operating travel direction T. The illustrated apparatus with center frames 17 locked to each other and inner and outer wing frames 19, 21 pivoting about the illustrated axes with respect to the center frames 17 and each other provides a wide implement apparatus, contemplated to be about 70 feet wide, that has good ground following characteristics.

Figure 5:
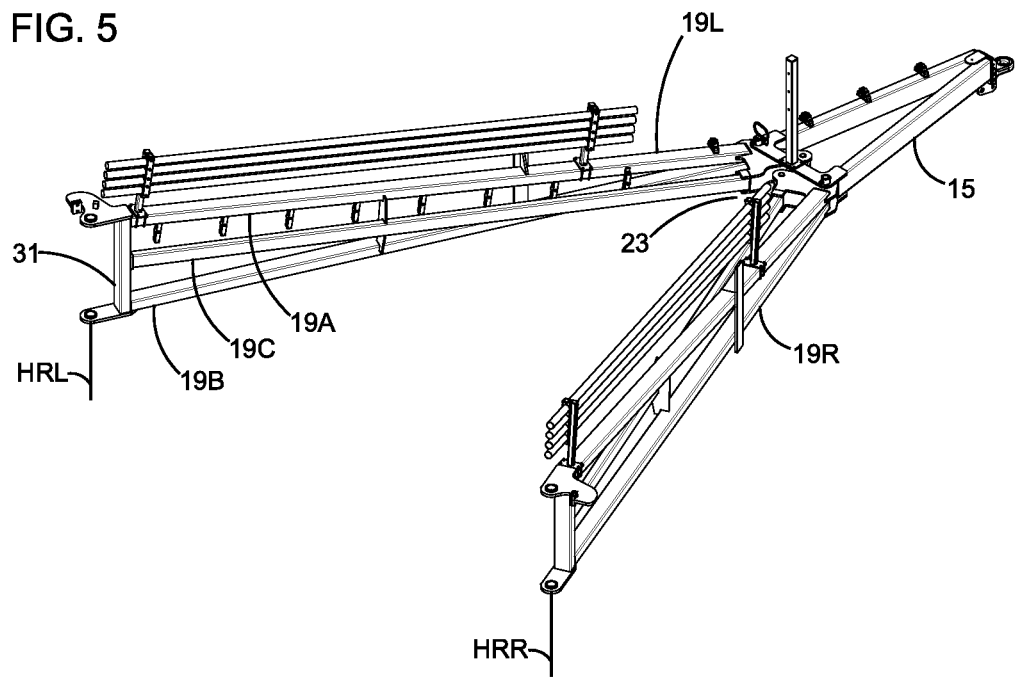
FIG. 5 is an top rear perspective view of the hitch arms and hitch frame of the embodiment of FIG. 1.
Figure 6:
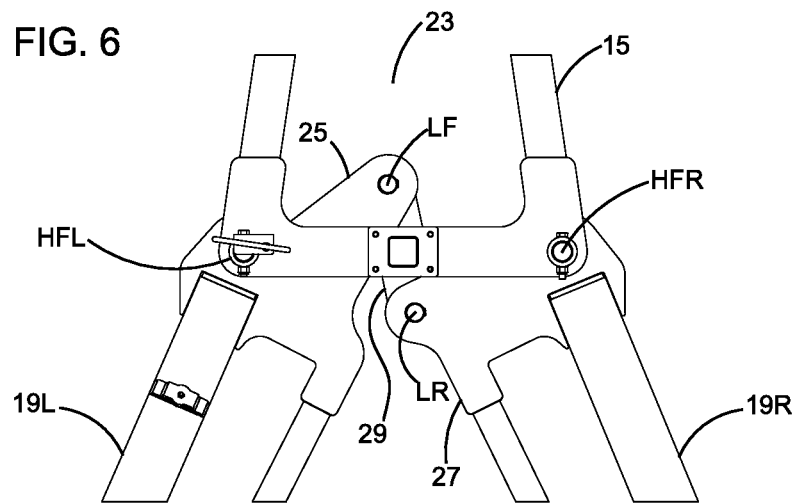
FIG. 6 is a top view of the link mechanism connecting the right and left hitch arms of the embodiment of FIG. 1.
Figure 7:
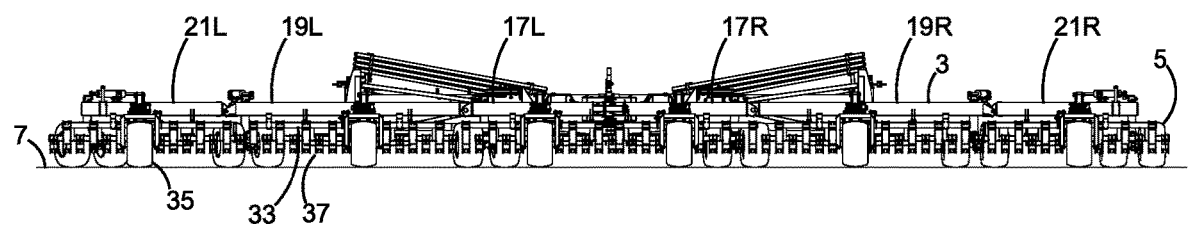
FIG. 7 is a rear view of the embodiment of FIG. 1.

To facilitate moving between the operating and transport positions the illustrated apparatus comprises a link mechanism 23 that keeps the right and left hitch arms 13R, 13L at substantially the same angle HN with respect to the central tool bar axis TA as the tool bar frame 3 moves between the operating and transport positions. As illustrated in FIGS. 5 and 6, the link mechanism 23 comprises a forward link bracket 25 fixed to a front portion of a first one of the right and left hitch arms 19 and extending toward a second one of the right and left hitch arms 19 and a rearward link bracket 27 fixed to a front portion of the second one of the right and left hitch arms 19 and extending toward the first one of the right and left hitch arms 19. In the illustrated link mechanism 23 the forward link bracket 25 is fixed to a front portion of the left hitch arm 19L and the rearward link bracket 27 is fixed to a front portion of the right hitch arm 19R, but it is contemplated the opposite arrangement would work as well.

A link bar 29 is pivotally attached at a front end thereof to the forward link bracket 25 about a substantially vertical front link axis LF and pivotally attached at a rear end thereof to the rearward link bracket 27 about a substantially vertical rear link axis LR. The link brackets 25, 27 are configured such that the link bar 29 is located between the right and left front hitch arm axes HFR, HFL, and such that when the tool bar frame 3 is in the operating position of FIG. 1, the front link axis LF is located substantially midway along a line between the right and left front hitch arm axes HFR, HFL, and when the tool bar frame 3 is in the transport position of FIG. 3, the rear link axis LR is located substantially midway along the line between the right and left front hitch arm axes HFR, HFL.

As shown in FIG. 5 the hitch arms 19 each comprise an upper arm beam 19A, a lower arm beam 19B, and a link support beam 19C rigidly attached to each other in a truss like arrangement to provide rigid arms 19. The upper and lower arm beams 19A, 19B are fixed to upper and lower ends of an upright end member 31 in proximity to the corresponding rear hitch arm axis HRR, HRL and slope toward each other toward the front end of the hitch arms 19 where they are fixed to one of the link brackets 25, 27. The link support beams 19C are rigidly attached at a rear ends thereof to a middle portion of the upright end member 31 and rigidly attached at front ends thereof to the corresponding one of the forward and rearward link brackets 25, 27.

It can be seen that movement of one of the right and left hitch arms 19R, 19L away from the central tool bar axis TA will cause the link bar 29 to force the other hitch arm 19 a substantially equal distance from the central tool bar axis TA, thus keeping the hitch arms 19 at substantially the same angle HN with respect to the central tool bar axis TA.

In the illustrated apparatus 1, a plurality of carrier frames 33 is attached at front ends thereof to the tool bar frame 3 such that the carrier frames 33 are laterally spaced along a width of the tool bar frame 3. The carrier frames 33 are each pivotally attached to the tool bar frame 3 about a carrier frame pivot axis CF oriented horizontally and perpendicular to the central tool bar axis TA when the tool bar frame 3 is in the operating position such that same are movable from the operating position shown in FIGS. 1-3 extending rearward from the tool bar frame 3 to the transport position shown in FIG. 4 extending upward from the tool bar frame 3. Each carrier frame 33 is supported by carrier wheel 35 mounted to a rear portion thereof and a plurality of ground engaging tools 37 is mounted to each carrier frame 33.

The tool bar wheels 5 and carrier wheels 35 are caster wheels pivotally mounted to the corresponding tool bar frame 3 and carrier frames 33 about vertical caster axes CAX. To support the weight of the tool bar frame 3, the tool bar wheels 5 are shown as castering dual wheel assemblies as are known in the art.

When the tool bar frame 3 is in the operating position, the tool bar wheels 5 are substantially free to pivot about their respective caster axes CAX and the carrier wheels 35 are secured by a carrier wheel securing mechanism 39 to resist pivoting about their respective caster axes CAX away from a forward orientation rolling in the operating travel direction T. The mechanism 39 keeps the carrier wheels 35 in the forward orientation, however when a significant torque force is exerted on the carrier wheels 35, the mechanism 39 will release the carrier wheels 35 to allow them to pivot in response to the torque force to reduce the possibility of the damage to the assembly.

When the tool bar frame 3 moves from the operating position toward the transport position the carrier wheel securing mechanism 39 is activated to release the carrier wheels 35 to allow them to pivot, and then both the tool bar wheels 5 and carrier wheels 35 are free to pivot about their respective caster axes CAX. Thus, in the operating position the carrier wheels 35 are substantially locked in the forward orientation to maintain stability of motion in the operating travel direction T, and during the movement to the transport position the carrier wheels 35 are free to pivot to facilitate movement of the apparatus 1 to the transport position and avoid lateral stresses on the carrier wheels 35.

When the tool bar frame 3 is in the transport position shown in FIG. 4 with the carrier frames moved to the transport position extending upward from the tool bar frame 3, the tractor moves the apparatus 1 in the operating travel direction T, and the tool bar wheels 5 pivot from the position they attained when the right and left tool bar frames 3R, 3L reached their transport position, shown in FIG. 3, to the forward orientation shown in FIG. 4. In order to maintain steering control of the apparatus 1 in the transport position when moving along roads and the like, a tool bar wheel locking mechanism 41 is activated to lock selected tool bar wheels 35 to prevent pivoting about their respective caster axes CA away from the forward orientation. In the illustrated apparatus 1 tool bar wheel locking mechanisms 41 are mounted to releasably lock the center tool bar wheels 5C, which are the rearmost tool bar wheels 5 when the tool bar frame 3 is in the transport position of FIG. 4. Thus, the center wheels 5C remain in the forward orientation during transport, and the tool bar wheels 5 located forward along the tool bar frame 3 can pivot to follow turns.

The tool bar wheels 3, carrier wheels 33, tool bar wheel locking mechanism 41, and carrier wheel securing mechanism 39 are illustrated in FIGS. 8-13. Each caster wheel, both tool bar wheels 5 and carrier wheels 35, is pivotally mounted to the corresponding tool bar frame 3 or carrier frame 33, by a wheel shaft 43 extending through a shaft aperture 45 in the corresponding frame 3, 33. The shaft 43 is rotatable in the shaft aperture 45 such that the wheel shaft 43 provides the corresponding vertical caster axis CAX.

Figure 8:
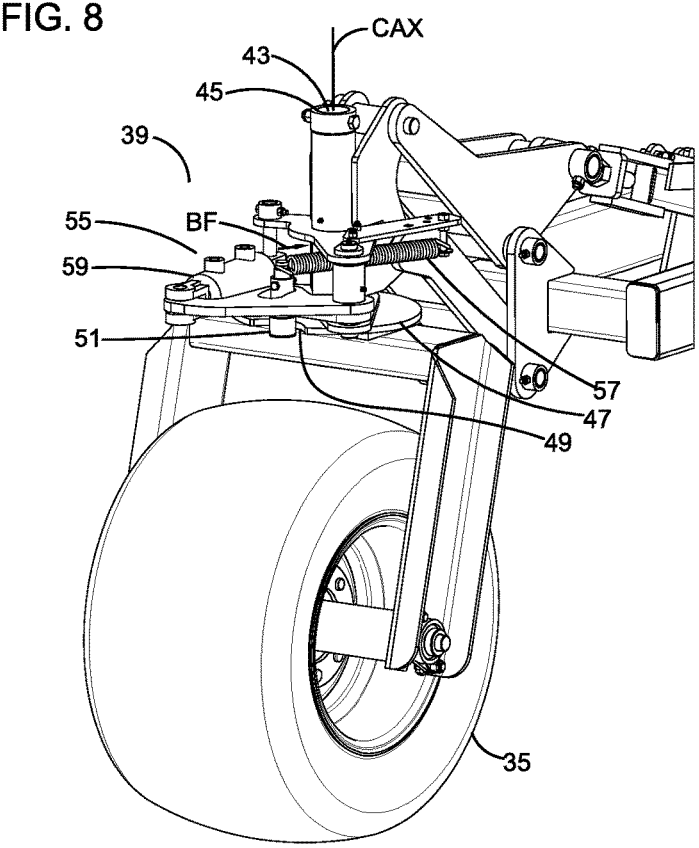
FIG. 8 is an top rear perspective view of a carrier wheel securing mechanism of the embodiment of FIG. 1 with the catch roller in the catch recess.
Figure 9:
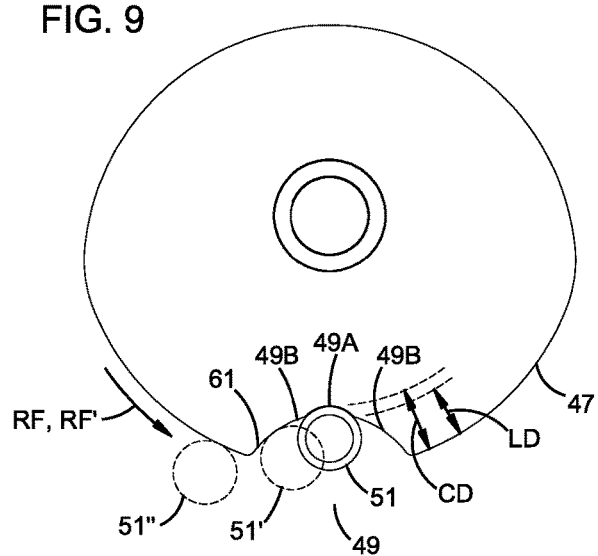
FIG. 9 is a schematic top view of the catch plate, catch recess, and catch roller of the carrier wheel securing mechanism of FIG. 8.
Figure 10:
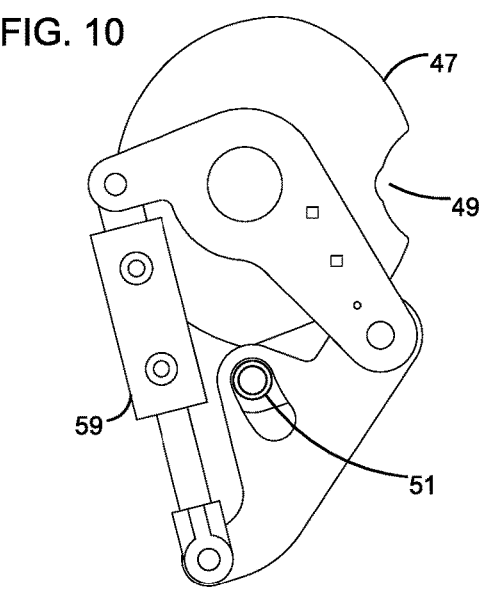
FIG. 10 is a top view of the carrier wheel securing mechanism of FIG. 8 with the catch actuator extended so the catch roller is in the release mode.
Figure 11:
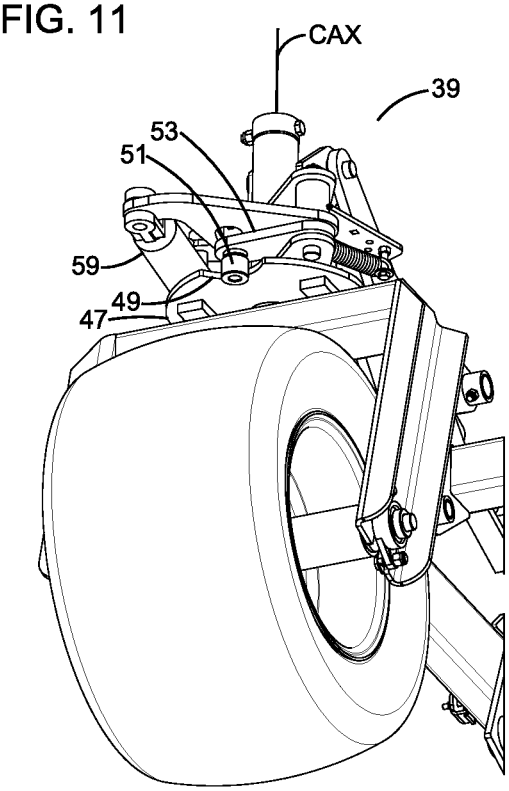
FIG. 11 is a bottom rear perspective view of the carrier wheel securing mechanism of FIG. 8 with the catch actuator retracted so that the catch roller is in the catch mode rolling along the outer periphery of the catch plate.

As described above each carrier wheel 35 is secured to resist pivoting about the respective caster axis CAX by a carrier wheel securing mechanism 39 comprising, as illustrated in FIGS. 8-10, a substantially horizontal catch plate 47 fixed to the corresponding wheel shaft 43, the catch plate 47 defining a catch recess 49 in a curved outer periphery thereof. A catch roller 51 is mounted to the carrier frame 33 on a catch arm 53 and configured, when in a catch mode, to roll along the outer periphery of the catch plate 47 as illustrated in FIG. 10 when the corresponding carrier wheel 35 pivots about the caster axis CAX thereof. A catch roller activator 55 is operative to move the catch roller 51 to the catch mode by exerting a bias force BF on the catch roller 51 toward the outer periphery of the catch plate 47, and is operative to move the catch roller 51 to a release mode by moving the catch roller 51 away from the outer periphery of the catch plate 47.

In the illustrated carrier wheel securing mechanism 39, the catch roller activator 55 comprises a spring 57 that exerts the bias force BF on the catch roller 51 and an extendable catch actuator 59 operative to move the catch roller 55 to the release mode by extending and moving the catch roller 51 away from the outer periphery of the catch plate 47 against the bias force BF as shown in FIG. 10.

The catch plate 47 and catch roller 51 are configured such that when the catch roller 51 is in the catch mode rolling along the outer periphery of the catch plate 47, and the wheel shaft 43 rotates in the shaft aperture 45 to a location where the catch roller 51 is aligned with the catch recess 49, the catch roller 51 is forced into the catch recess 51 where the corresponding carrier wheel 35 is in the forward orientation and the catch roller 51 in the catch recess 49 and resists further rotation of the wheel shaft 43 in the shaft aperture 45.

In the illustrated carrier wheel securing mechanism 39, the catch recess 49 comprises a center portion 49A configured to conform to an outer surface of a portion of the catch roller 51, and lateral portions 49B on each side of the center portion 49A. The center portion 49A has a center depth CD greater than a lateral depth LD of the lateral portions 49B such that when the shaft 43 rotates, the spring 57 will force the roller 51 into the deeper center portion 49A where the corresponding carrier frame wheel 35 is in the forward orientation. The center depth CD is greater than the lateral depth LD by a distance that is less than one half of a diameter of the catch roller 51 such that a first rotational release force RF exerted on the wheel shaft 43, and thus on the catch plate 47, will move the catch roller 51 to the lateral portion, indicated by the catch roller 51' in phantom lines, corresponding to the direction of the first release force.

The lateral portions 49B comprise side edges 61 sloping from the center portion to the outer periphery of the catch plate such that a second rotational release force RF' exerted on the wheel shaft 43 that is greater than the first rotational release force RF will move the catch roller 51 up the side edges 61 to the outer periphery of the catch plate 47.

Figure 12:
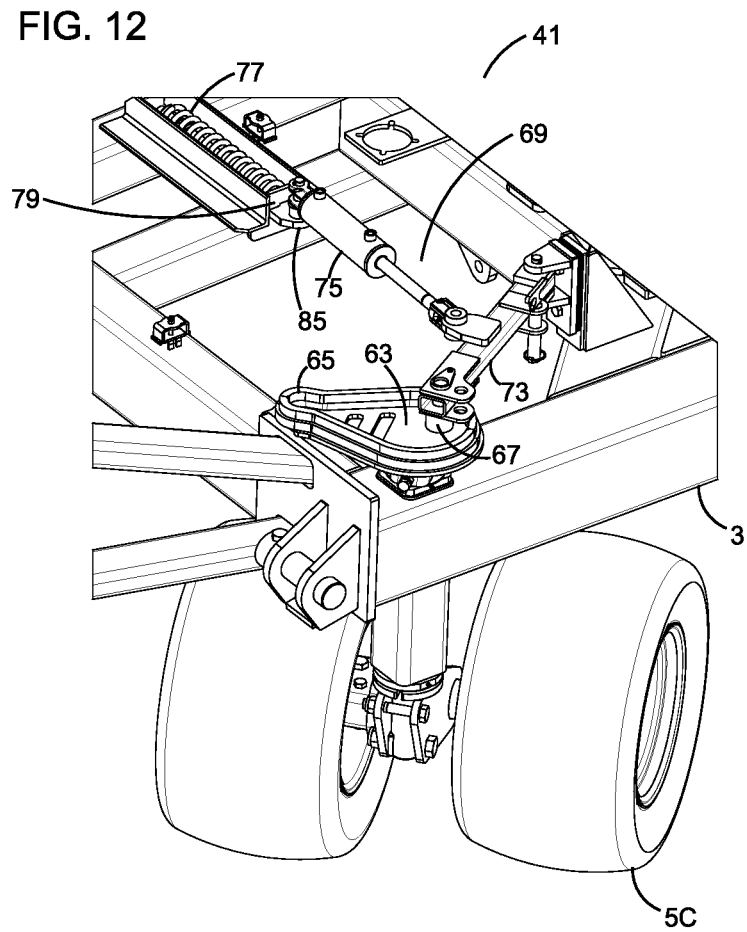
FIG. 12 is a top front perspective view of a tool bar wheel locking mechanism of the embodiment of FIG. 1 with the lock actuator extended so the lock roller is in the release mode.
Figure 13:
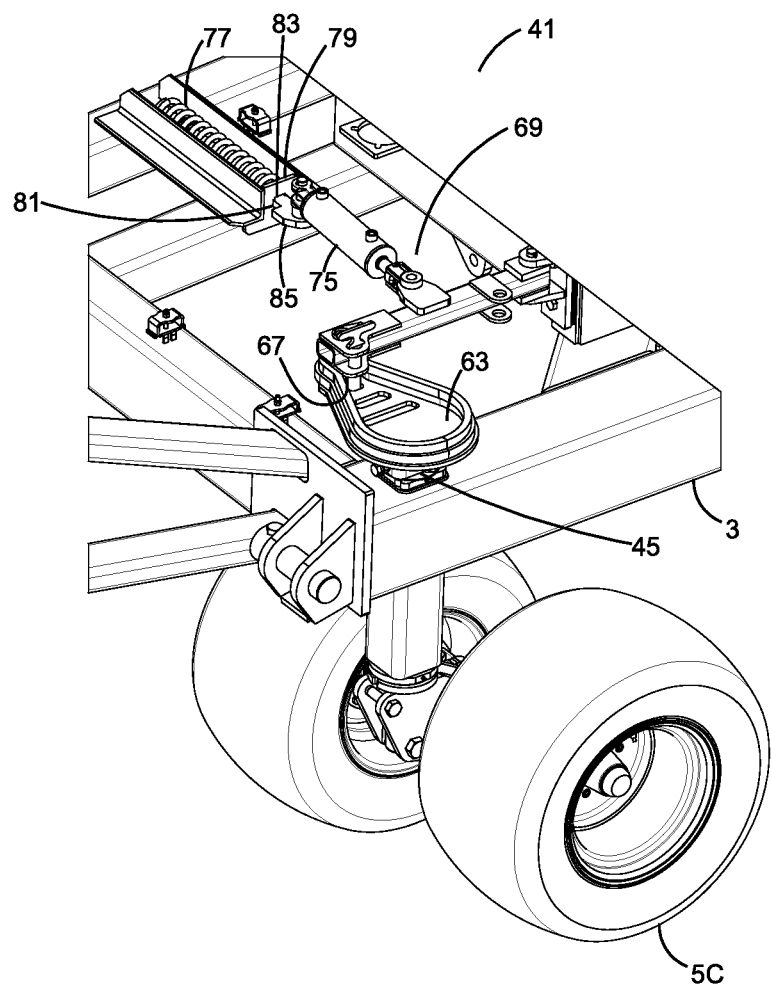
FIG. 13 is a top front perspective view of the tool bar wheel locking mechanism of FIG. 12 with the lock actuator retracted so the lock roller is in the lock mode and is seated in the lock slot.

In the illustrated apparatus 1 the tool bar wheel locking mechanism 41 comprises, as illustrated in FIGS. 12 and 13, a horizontal lock plate 63 fixed to the corresponding wheel shaft 43 and defining a lock slot 65 in an outer periphery thereof. A lock roller 67 is movably mounted to the tool bar frame 3 and configured, when in a lock mode, to roll along the outer periphery of the lock plate 63 when the corresponding selected tool bar wheel, one of the center tool bar wheels 5C, pivots about the caster axis CAX thereof.

A lock roller activator 69 is operative to move the lock roller 67 to the lock mode by exerting a bias force BF on the lock roller 67 toward the outer periphery of the lock plate 63, and operative to move the lock roller 67 to a release mode by moving the lock roller 67 away from the outer periphery of the lock plate 63. The lock plate 63 and lock roller 67 are configured such that when the lock roller 67 is in the lock mode and the tool bar wheel shaft 43 rotates in the shaft aperture 45 to a location where the lock roller 67 is aligned with the lock slot 65, the tool bar wheel 5C is in the forward orientation when the tool bar frame 3 is in the transport position, and the lock roller 67 is forced into the lock slot 65 and prevents further rotation of the tool bar wheel shaft 43 in the shaft aperture 45.

The lock slot 65 has a width only slightly greater than, substantially equal to, the diameter of the lock roller 67, and a depth substantially equal to or greater than the length of the lock roller 67 such that the risk of the lock roller 67 moving out of the lock slot 65 and releasing the corresponding center tool bar wheel 5C to pivot is small.

In the illustrated tool bar wheel locking mechanism 41, the lock plate 63 is mounted to a top of the corresponding wheel shaft 43 and a wall 71 extends upward from the outer periphery thereof and defines the lock slot 65. The lock roller 67 is inside the wall 71 and configured to roll along an inner surface of the wall 71 when in the lock mode such that when the wheel shaft 43 rotates in the shaft aperture 45 to a location where the lock roller 67 is aligned with the lock slot 65, the lock roller 67 is forced into the lock slot 65 and prevents further rotation of the wheel shaft 43 in the shaft aperture 45.

A lock arm 73 is pivotally attached to the tool bar frame 3 and the lock roller 67 is rotatably mounted to an outer end of the lock arm 73. The lock roller activator 69 comprises an extendable lock actuator 75 attached between the tool bar frame and the lock arm 73 and operative to move the lock roller 67 to the release mode by moving the lock roller 67 to an open area above the lock plate 63 removed from the walls as shown in FIG. 12, and operative to move the lock roller 67 to the lock mode by exerting the bias force BF on the lock arm 73 to force the lock roller 67 against the inner surface of the wall 71.

The lock roller activator 69 also comprises a coil spring 77 with an inner end bearing against a spring plate 79 extending from the tool bar frame 3, and a spring shaft 81 extending through the spring 77 from an outer end thereof to the inner end thereof and through a shaft hole 83 in the spring plate 79 and attached to a stop member 85 that is larger than the shaft hole 83. The extendable lock actuator 75 is attached to the stop member 85 such that when the extendable lock actuator 75 is extended the stop member 85 bears against the spring plate 79 as seen in FIG. 12 and the lock roller 67 is moved to the release mode where the lock plate 63 and attached wheel shaft 43 are free to pivot.

When the extendable lock actuator 75 is retracted the stop member 85 moves away from the spring plate 81 as seen in FIG. 13, the spring 77 exerts the bias force BF on the extendable lock actuator 75 and the lock roller 67 is moved to the lock mode bearing against the wall 71.

Figure 14:
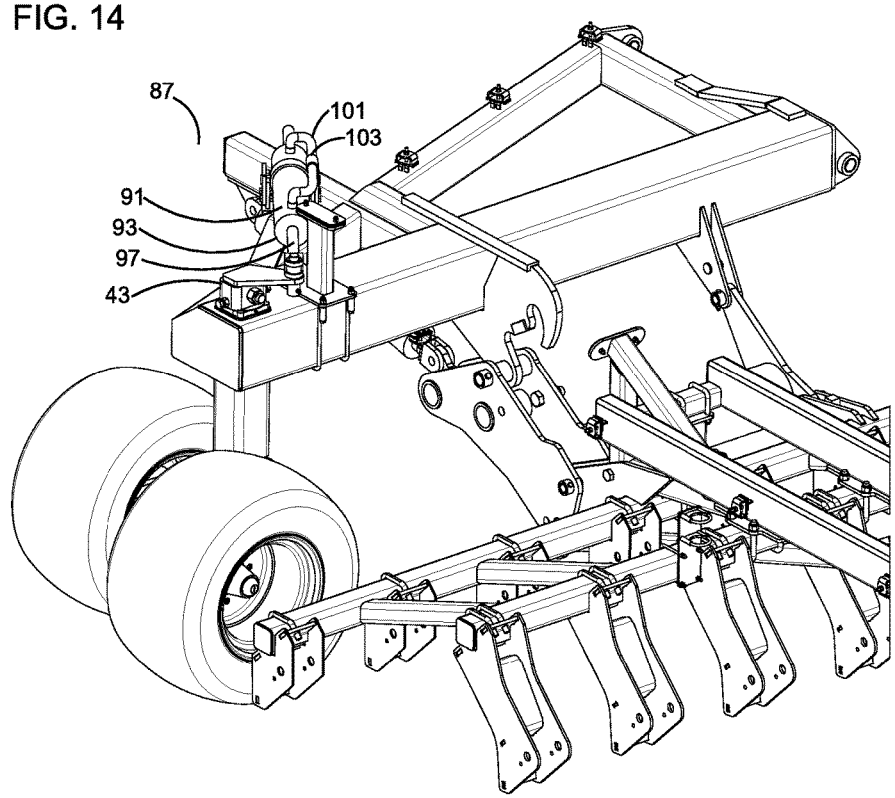
FIG. 14 is a top rear perspective view of the damping mechanism of the embodiment of FIG. 1.

The tool bar wheels 5 of the illustrated apparatus 1 include selected tool bar wheels, here selected to be center tool bar wheels 5C, that are locked when the tool bar frame 3 is in the transport position and unselected tool bar wheels, here the tool bar wheels 5W mounted on the right and left inner and outer wing frames 19R, 19L, 21R, 21L. To reduce wheel wobble when travelling at higher speeds in the transport position the wheel shaft 43 of each unselected tool bar wheel 5W is connected to a damping mechanism 87, as shown in FIG. 14, when the tool bar frame 3 is in the transport position. The damping mechanism 87 is operative to resist pivoting of the wheel shafts 43 of the unselected tool bar wheels 5W.

Figure 15:
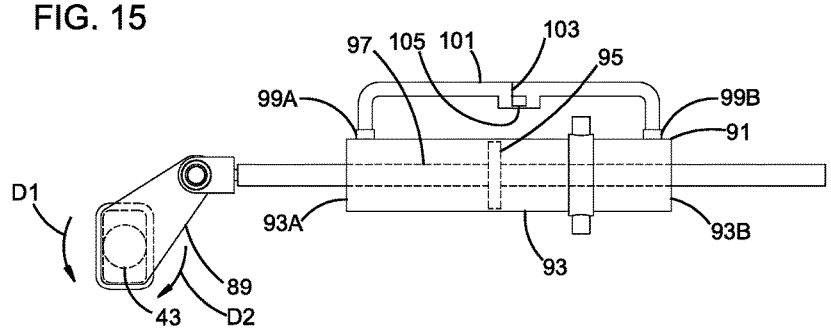
FIG. 15 is a schematic sectional view of the hydraulic cylinder, conduit, and valve mechanism of the damping mechanism of FIG. 14 with the valve mechanism in the damping mode.
Figure 16:
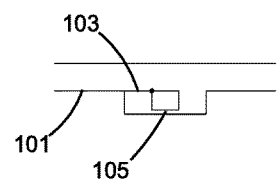
FIG. 16 is a schematic sectional view of the conduit and valve mechanism of the damping mechanism of FIG. 14 with the valve mechanism in the release mode.

In the illustrated apparatus 1 the damping mechanism 87 comprises a crank 89 extending laterally from the corresponding wheel shaft 43 and a hydraulic cylinder 91, schematically illustrated in FIGS. 15 and 16, comprising a barrel 93 with first and second end caps 93A, 93B on corresponding first and second ends of the barrel 93 and sealing the barrel, a piston 95 inside the barrel, and a piston shaft 97 extending through the first end cap 93A. There is a first port 99A in the barrel 93 adjacent the first end cap 93A and a second port 99B in the barrel adjacent the second end cap 93B. A conduit 101 connects the first and second ports 99A, 99B, and there is a valve mechanism 103 in the conduit 101. The barrel 93 and conduit 101 are filled with hydraulic fluid and an outer end of the piston shaft 97 is connected to the crank 89.

As can be seen in the figures; pivoting of the wheel shaft 43 in a first direction D1 moves the piston 95 toward the first port 99A and forces hydraulic fluid out of the first port 99A and through the conduit 101 and valve mechanism 103 and into the second port 99B, and pivoting of the wheel shaft 43 in a second direction D2 moves the piston 95 toward the second port 99B and forces hydraulic fluid out of the second port 99B and through the conduit 101 and valve mechanism 103 and into the first port 99A.

To reduce hazardous wheel wobble when travelling at higher speeds in the transport position, when the tool bar frame 3 is in the transport position the valve mechanism 103 is activated in a damping mode as schematically illustrated in FIG. 15 to direct the hydraulic fluid through a small orifice 105 such as a needle valve to restrict flow through the conduit 101. This restriction causes the hydraulic fluid to exert back pressure on the piston 95 and crank 89 such that movement of the crank 89 which accompanies wheel wobble, is resisted. Pivoting movement is allowed such as during turns, however erratic movements during travel in the operating travel direction are resisted.

When the tool bar frame 3 is in the operating position the valve mechanism 103 is activated in a release mode as schematically illustrated in FIG. 16 to allow unrestricted flow through the conduit 101 and allow the unselected tool bar wheels 5W to pivot freely.

Figure 17:
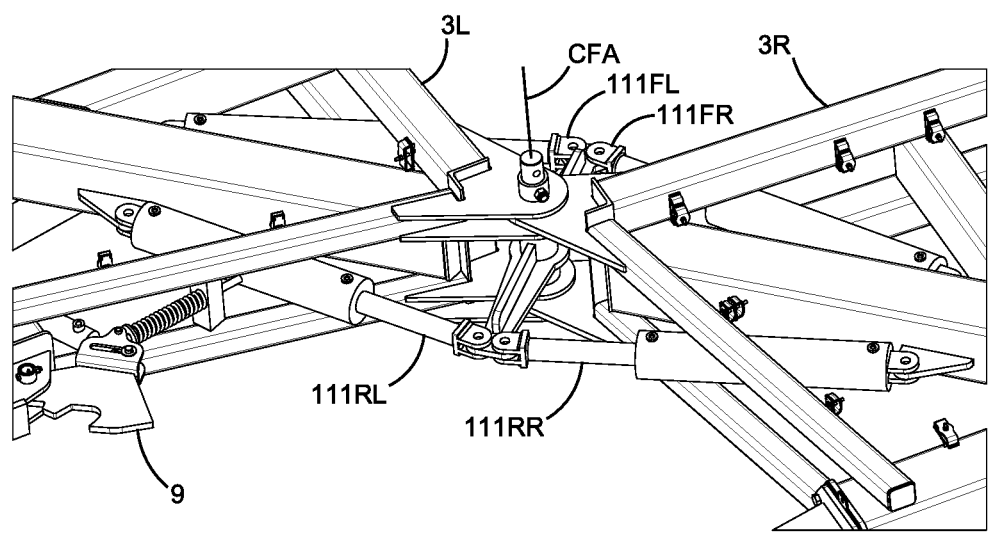
FIG. 17 is a rear perspective view of the hydraulic cylinder assembly of the embodiment of FIG. 1 for moving between the operating and transport positions.

In the illustrated apparatus 1, a hydraulic cylinder assembly 110 is operative to selectively pivot the right and left tool bar frames 3R, 3l about the center frame axis CFA between the operating position and the transport position. The assembly 110 is shown in FIG. 17 and includes front and rear right hydraulic cylinders 111FR, 111RR and front and rear left hydraulic cylinders 111FL, 111RL. A center beam 113 is pivotally attached to the right and left tool bar frames 3R, 3l about the center frame axis CFA, and the front and rear right hydraulic cylinders 111FR, 111RR are connected between front and rear ends of the center beam and the right tool bar frame 3R, and the front and rear left hydraulic cylinders 111FL, 111RL are connected between front and rear ends of the center beam and the left tool bar frame 3L.

In the operating position of FIG. 1 the rear hydraulic cylinders 111RR, 111RL are fully retracted and the front hydraulic cylinders 111FR, 111FL are fully extended. To move from the operating position to the transport position pressurized hydraulic fluid is directed into the hydraulic cylinders to extend the rear hydraulic cylinders 111RR, 111RL and to retract the front hydraulic cylinders 111FR, 111FL. In the transport position of FIG. 3 the rear hydraulic cylinders 111RR, 111RL are then fully extended and the front hydraulic cylinders 111FR, 111FL are fully retracted. Moving from the transport position to the operating position is accomplished by reversing the process.

The present disclosure thus provides a wide forward folding implement where no complex and costly telescoping mechanism is required. All wheels are castering wheels, facilitating movement between the operating and transport positions, and the pivoting movement of the wheels about the respective caster axes is controlled to provide a desired operating castering action when the tool bar frame 3 is in the operating position, and a different desired transport castering action when the tool bar frame 3 is in the transport position. The castering action is controlled conveniently by hydraulic cylinders, electric actuators, or like devices which may be operated manually or remotely from the towing vehicle.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. An implement apparatus comprising:
a tool bar frame mounted on tool bar wheels for travel along a ground surface in an operating travel direction, the tool bar frame comprising a right tool bar frame and a left tool bar frame pivotally attached at a front inner end thereof to a front inner end of the right tool bar frame about a substantially vertical center frame axis located on a central tool bar axis that is aligned with the operating travel direction in a center of the tool bar frame;
wherein the tool bar frame is movable from an operating position, where the right and left tool bar frames are oriented substantially perpendicular to the central tool bar axis and extend laterally away from the central tool bar axis, to a transport position where the right and left tool bar frames are substantially aligned with the central tool bar axis and extend forward from the center frame axis;
an operating position latch operative to releasably connect a rear portion of the right tool bar frame to a rear portion of the left tool bar frame when the tool bar frame is in the operating position;
a transport position latch operative to releasably connect the right tool bar frame to the left tool bar frame when the tool bar frame is in the transport position;
right and left hitch arms pivotally attached at rear ends thereof to spaced apart locations on front portions of the corresponding right and left tool bar frames about substantially vertical corresponding right and left rear hitch arm axes and extend forward from the tool bar frame and inward toward the central tool bar axis when the tool bar frame is in the operating position;
a rigid hitch frame adapted at a front end thereof for attachment to a towing vehicle and pivotally attached at corresponding right and left rear portions thereof to front ends of the corresponding right and left hitch arms about corresponding substantially vertical right and left front hitch arm axes;
wherein the hitch arms and hitch frame are configured such that when the tool bar frame is in the transport position, the rear end of the hitch frame is forward of the right and left tool bar frames, and the front end of the rigid hitch frame is a desired clearance distance forward of the right and left tool bar frames.

2. The apparatus of claim 1 wherein:
the right tool bar frame comprises a right center frame and a right inner wing frame pivotally attached to the right end of the right center frame about a right inner wing frame axis oriented, when the tool bar frame is in the operating position, substantially horizontally and aligned with the operating travel direction;
the left tool bar frame comprises a left center frame and a left inner wing frame pivotally attached to the left end of the left center frame about a left inner wing frame axis oriented, when the tool bar frame is in the operating position, substantially horizontally and aligned with the operating travel direction; and
the right and left rear hitch arm axes are located on front sides of the corresponding right and left inner wing frames.

3. The apparatus of claim 2 comprising:
a right outer wing frame pivotally attached to the right end of the right inner wing frame about a right outer wing frame axis oriented, when the tool bar frame is in the operating position, substantially horizontally and aligned with the operating travel direction;
a left outer wing frame pivotally attached to the left end of the left inner wing frame about a left outer wing frame axis oriented, when the tool bar frame is in the operating position, substantially horizontally and aligned with the operating travel direction.

4. The apparatus of claim 1 comprising a link mechanism operative to maintain the right and left hitch arms at substantially the same angle with respect to the central tool bar axis as the tool bar frame moves between the operating and transport positions.

5. The apparatus of claim 4 wherein the link mechanism comprises:
a forward link bracket fixed to a front portion of a first one of the right and left hitch arms and extending toward a second one of the right and left hitch arms and a rearward link bracket fixed to a front portion of the second one of the right and left hitch arms and extending toward the first one of the right and left hitch arms;
a link bar pivotally attached at a front end thereof to the forward link bracket about a substantially vertical front link axis and pivotally attached at a rear end thereof to the rearward link bracket about a substantially vertical rear link axis; and
wherein the link brackets are configured such that the link bar is located between the right and left front hitch arm axes.

6. The apparatus of claim 5 wherein when the tool bar frame is in the operating position, the front link axis is located on a line between the right and left front hitch arm axes, and when the tool bar frame is in the transport position, the rear link axis is located on the line between the right and left front hitch arm axes.

7. The apparatus of claim 6 wherein when the tool bar frame is in the operating position, the front link axis is midway between the right and left front hitch arm axes, and when the tool bar frame is in the transport position, the rear link axis is midway between the right and left front hitch arm axes.

8. The apparatus of claim 7 wherein the hitch arms each comprise an upper arm beam and a lower arm beam fixed at rear ends thereof to upper and lower portions of an upright end member in proximity to the corresponding rear hitch arm axis, and sloping toward each other and fixed at front ends thereof to one of the forward and rearward link brackets and a link support beam rigidly attached at a rear end thereof to a middle portion of the upright end member, and rigidly attached at a front end thereof to the corresponding one of the forward and rearward link brackets.

9. The apparatus of claim 1 wherein the tool bar wheels are each pivotable about a substantially vertical caster axis with respect to the tool bar frame when the tool bar frame is in the operating position.

10. The apparatus of claim 9 wherein selected tool bar wheels are locked to prevent pivoting when the tool bar frame is in the transport position.

11. The apparatus of claim 10 comprising a plurality of carrier frames attached at front ends thereof to the tool bar frame such that the carrier frames are laterally spaced along a width of the tool bar frame, and such that the carrier frames are movable from an operating position extending rearward from the tool bar frame to a transport position extending upward from the tool bar frame.

12. The apparatus of claim 11 wherein each carrier frame is supported at a rear end thereof by a carrier wheel, and each carrier wheel is pivotable about a substantially vertical caster axis with respect to the carrier frame and wherein the carrier wheels are secured to resist pivoting when the tool bar frame is in the operating position.

13. The apparatus of claim 1 comprising a hydraulic cylinder assembly operative to selectively pivot the right and left tool bar frames about the center frame axis between the operating position and the transport position.

* * * * *